3,513,117
THIXOTROPIC, NON-SAG, ONE-COAT PAINT
Earl F. Carlston, El Cerrito, and William H. Ellis, El Segundo, Calif., assignors to Chevron Research Company, San Francisco, Calif., a corporation of Delaware
Continuation-in-part of application Ser. No. 562,302, July 1, 1966. This application Mar. 10, 1969, Ser. No. 837,963
Int. Cl. C08g 17/16; C09d 3/64, 5/04
U.S. Cl. 260—22
7 Claims

ABSTRACT OF THE DISCLOSURE

Paints having as non-volatile vehicles, ternary mixtures of oil-modified alkyd resins having different oil lengths, the interaction between the resins imparting non-sag and thixotropic properties to the paints.

REFERENCE TO RELATED APPLICATION

Figure 1:
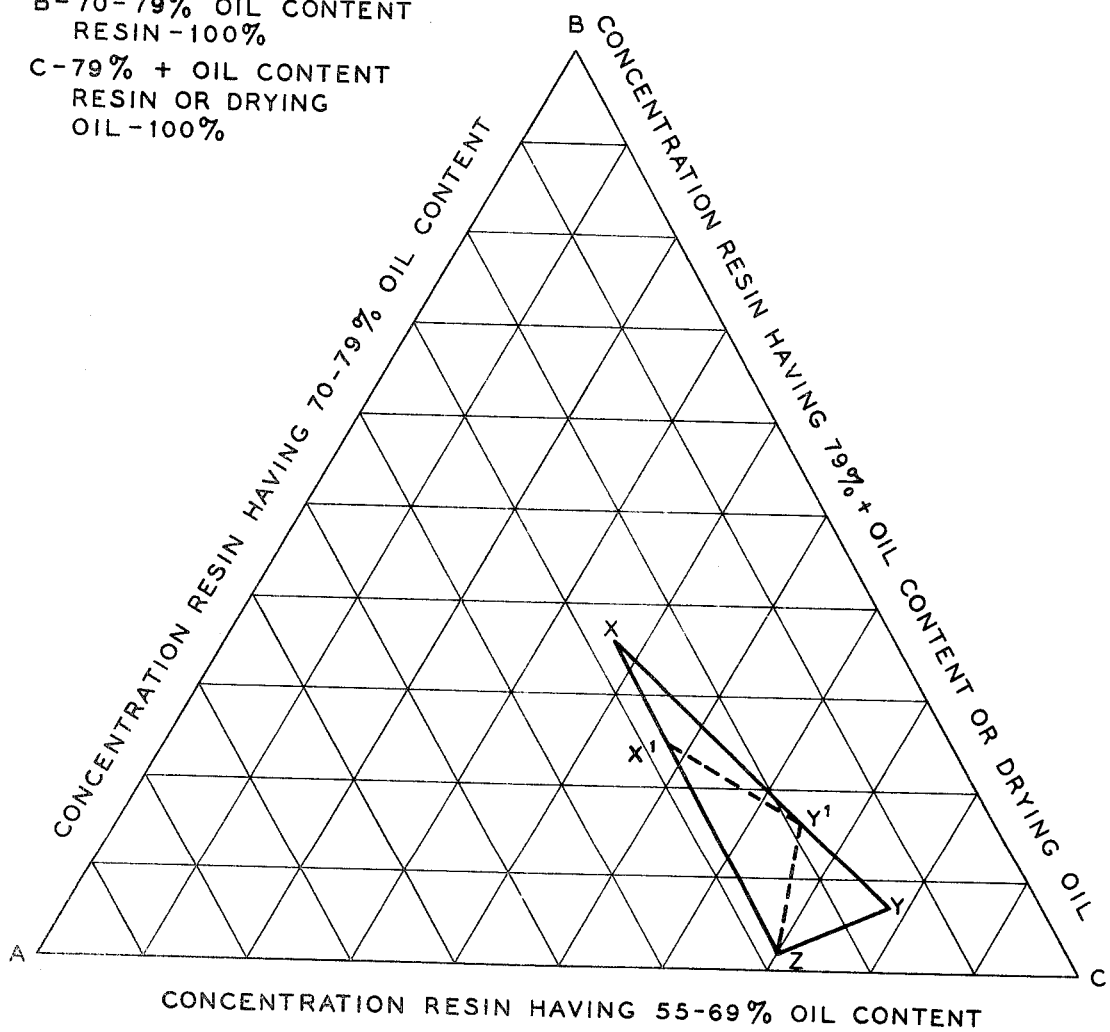

This application is a continuation-in-part of application Ser. No. 562,302, filed July 1, 1966, now abandoned.

BACKGROUND OF THE INVENTION

Field of the invention

The present invention relates to one-coat, non-sag, thixotropic paints and as bases for the paints, non-volatile vehicles which are ternary mixtures of certain oil-modified alkyd resins or mixtures of the resins and drying oils. The vehicles are especially useful in preparing high-gloss enamels.

Description of the prior art

In the paint art, it has been found highly advantageous to employ one-coat paints. It is obvious from the point of economy that the use of a paint which will provide adequate coverage of surfaces with one coat will reflect substantial savings in labor and materials over the use of ordinary paints, which often require two or more applications. One-coat paints are defined in the art as those that have sufficient hiding power to cover any color of surface in one application by brush, roller or spray. In the case of enamels, the problem of providing one-coat materials is aggravated because in order to obtain desired gloss, enamels are usually formulated with a low pigment content. Thus, the addition of more pigment to provide a greater hiding power and make enamels suitable for one-coat application results in loss of the desired gloss. Moreover, addition of pigment to increase hiding power is only effective to a certain degree. For example, in the case of white enamels using titanium dioxide as the hiding pigment, 25 to 30% of pigment volume concentration produces maximum hiding, further addition results only in a small change in hiding power and a great increase in viscosity.

A second approach that is often taken in order to increase hiding power is to apply the paint to the surface in a thicker film. In order to accomplish this, a means of applying a proper flow must be used. In any event, and most especially in brushing or rolling application, serious problems of proper flow and brushability of the paints arise. Thus, if the solids content of the paint is increased in order to achieve a thicker film, the viscosity of the paint is increased and brushing is made much more difficult. A common practice which is used in order to overcome these difficulties is the use of thixotropic paint vehicle. A thixotropic paint will flow easily when pressure is applied, but will assume a gel structure when the pressure is removed, allowing greater coat thicknesses. Means which have been used to impart thixotropic character to paints have been the use of certain additives and the use of thixotropic alkyd resins as a vehicle. Among the materials which have been used to modify the flow properties of paint are water; bodied oils, which are bodied just short of gelation, and act to raise the average vehicle viscosity; metallic soaps; certain acidic materials in situ soaps with the basic pigments; silica pigments, which provide the effect of a flocculated structure; and colloidal-type additives, which swell in the vehicles to yield a colloidal structure with thixotropic properties. The obvious advantage of a thixotropic paint is that it will have a low viscosity under the shearing action of a brush and a high viscosity at rest. This effect results in a highly desirable combination of properties, particularly if the recovery from low to high viscosity is relatively slow and the paint contains a solvent of low volatility. Under these conditions, the bulk consistency of the paint will be high enough to prevent dripping and splattering, but the paint will flow and spread easily under the shearing action of the brush. The return to high viscosity with removal of the brush shear prevents sagging and enhances the hiding power by permitting the application of a thick film.

In U.S. patent application 562,304 filed July 1, 1966 there are disclosed thixotropic resin vehicles and paint prepared from the vehicles, wherein the vehicles comprises a mixture of two particular oil-modified alkyl resins or a particular alkyd with a drying oil. Thus the mixture comprises a thixotropic mixture of two materials normally nonthixotropic when by themselves.

SUMMARY OF THE INVENTION

It has now been found that paints possessing excellent brushability, hiding power, sag resistance, and even greater gloss characteristics than the two-resin paints previously referred to, may be compounded employing as a non-volatile vehicle, a ternary mixture of alkyd resins or alkyd resins and drying oil, the mixture comprising a combination of (A) a modified alkyd resin having an oil content between about 55 and 69 weight percent, (B) a second alkyd resin having an oil content between about 70 weight percent and 79 weight percent, and (C) an alkyd resin having an oil content of greater than 79 weight percent or a drying oil. The vehicles thus comprise either a mixture of three alkyl resins or two alkyd resins and a drying oil. There should be a difference of at least 6 and preferably 9 percent in oil content between each of the components. Thus, in general, the greater the difference, the greater the thixotropy. It is preferred that component A have an oil content of from 57 to 66 weight percent, and component C be an alkyd resin with an oil content of about 85 weight percent.

DESCRIPTION OF THE PREFERRED EMBODIMENTS

The preferred resins are the oil modified phthalate resins. These materials are polymeric polyesters of polyhydric alcohols having more than two hydroxyl groups, e.g., glycerol and the resinifying polycarboxylic acids comprising phthalic acids including orthophthalic, isophthalic and terephthalic acid. A portion of the polycarboxylic acid is replaced by a fatty acid from vegetable or marine oils to produce an oil-modified alkyd resin. Resins may be made with drying, semi-drying or non-drying oils. However, the drying and semi-drying oils are preferred for the paints and vehicles of this invention. Oils which are commonly employed in the modification of the resins include the drying oils such as linseed and dehydrated castor oil, and the semi-drying oils such as soybean oil, etc. The modification may be made by employing selected fatty acids in the manufacture, rather than using the oil itself. The preparation of these modified resins is well known in the art, there being numerous patents in other publications directed to the subject, and since the preparation comprises no part of this invention, it will not be further elaborated. However, it may be noted that suitable alkyds include those which contain a wide variety of polyhydric alcohols, i.e., those other than glycerol. For example, pentaerythritol is often used to replace part of the glycerol and to produce further modified characteristics in the resins. Thus, included among the polyfunctional alcohols which may be employed are glycol, diethylene glycol, triethylene glycol, propylene glycol, dipentaerythritol, sorbitol, mannitol, etc.

The non-volatile vehicles of the invention are prepared by simply mixing together the appropriate quantities of the desired resins and oil. The paints are prepared conventionally, with the provision that the resins, etc., must be mixed together either prior to or concurrently with the addition of the pigment. Thus, it is not suitable for the pigment to be added to each resin component and then the material milled together, as this procedure will not produce the desired thixotropic properties.

The proper proportions of the resin and oil components, A, B, and C, can be selected from the area defined by the points X, Y, and Z of the annexed triangular coordinate graph, a still more preferred area being that defined by the points X', Y', and Z. These areas, as will be shown, are determined by the combination of maximum areas of sag resistance, leveling and brushability obtained for a number of resin combinations. The greatest determinative effect is given to sag resistance, as this characteristic is most important in the development of one-coat paints, especially high-gloss enamels. It may be noted that the proportions on the graph are specified as weight percent of the component, $x$ being the resin having an oil content of from 55 to 69 percent, $y$ the resin of 70 to 79 weight percent oil, and $z$ the resin of greater than 79 weight percent oil or the drying oil. In order to determine the properties of the vehicles and paints, the following determinations were employed:

Viscosity of resin solutions (vehicles)

The viscosity of resin solutions was determined with the Zeitfuchs cross-arm viscometer. The determination was made according to ASTM Method D-445-Test for Kinematic Viscosity, Appendix F. The readings are given directly in centistokes, which can be converted to centipoises by multiplying by the density.

Paint viscosity, Krebs units

The Krebs-Stormer viscosity is the most commonly used scale for comparing the viscosities of brushing enamels. The Krebs-Stormer viscosimeter employs a two-bladed paddle immersed in the paint. Weights attached to the paddle through a pulley system cause the paddle to rotate. The weight required to rotate the paddle at 200 r.p.m. is proportional to the viscosity in Krebs Units (KU).

Brushability

Brushability in the art is the ease with which the brush can be moved across to the surface while the paint is being applied. It is thus a measure of the high shear viscosity of the paint, and this figure must be low for good brushability. In this work the brushability was measured with a Brushometer, which is a viscosimeter operating at a high shear rate of about 20,000 sec.-1. The instrument and methods of operation have been described by Patton (Thomas C. Patton), "A Modern Approach to the Measurement and Evaluation of Brushability," Official Digest of the Federation of Societies for Paint Technology, 36-745 (1964). In the test, the head of the instrument is immersed in the paint. The paint is sheared in the annular space between a rotating shaft and a suspended cylinder, the torque transmitted from the shaft through the paint to the cylinder is read from a dial and is proportional to the viscosity in poises.

Sag resistance

Sagging is the downward flow of paint that results in an uneven film thickness. It appears most often as "curtains" or "tears" on the painted surface. A painter will almost always adjust the amount of paint he is applying to avoid sagging; thus a paint with low sag resistance will usually hide poorly. Sag resistance depends primarily on the low-shear viscosity of the paint during the initial stages of drying. Either the initial viscosity should be high, or it should rise rapidly during the first few minutes after application.

Sag resistance is measured by applying a series of stripes of varying film thickness to a glass plate, placing the plate in a vertical position with the stripes horizontal and measuring the percent increase in width of the stripes after the paint has dried. This procedure is described in an article by D. J. Rassmussen and W. H. Ellis, "The Measurement and Control of Paint Sagging," Official Digest of the Federation of Societies for Paint Technology, 34-1104 (1962). Results are reported as the film thickness at 50% or 100% increases in stripe width. Originally, the stripes are ¼" in width and ¼" apart. The stripes are laid down with a metal blade, leaving a wet film having a thickness of about one-half the clearance of the blade, and the results are usually repotred in terms of blade clearance rather than actual wet film thickness. The scale runs from a poor rating of 2 to an excellent rating of 18.

Leveling

Leveling is the ability of a paint to form a smooth film after application and to eliminate brush marks and other surface irregularities. It depends primarily upon surface tension and viscosity of the paint during initial stages of drying. A low viscosity paint under low-shear conditions will have good leveling. Leveling is evaluated by the method of the New York Paint Society. Reference to the method may be found in New York Society for Paint Technology, "The Evaluation of Leveling by a Draw-Down Method," Official Digest of the Federation of Societies for Paint Technology, 32-1435 (1960). According to the method, pairs of stripes of 5 different film thicknesses are applied to a glass plate in a manner similar to that used to evaluate sag resistance. The flowing together of the duplicate paint stripes is a measure of leveling when the panels are allowed to dry in a horizontal position. The paints are rated on a scale where 0 is poor and 10 is excellent.

Gloss

Gloss is the ability of a dried paint film to reflect light and to reflect images distinctly. The desired gloss will vary with the end use of the product, and its level depends mostly upon the inherent nature of the resin and the type and amount of pigmentation. For the highest gloss, however, lowest viscosity is required because the paint must flow sufficiently to cover all pigment particles and form a smooth surface. Gloss is measured by means of the Gardner Gloss Meter, which is a photoelectric device that measures the percent of incandescent light reflected by the paint surface.

In order to demonstrate the outstanding characteristics of the paints of this invention, paints were prepared using a two-resin system and a comparable three-resin system of this invention. Table I below gives the compositions and properties of the resins employed.

TABLE I.—RESIN PROPERTIES

| Properties | Resin 1 | Resin 2 | Resin 3 |
|---|---|---|---|
| Oil type | Soya-safflower | Safflower | Soya-safflower. |
| Dibasic acid type | Isophthalic | Isophthalic | Phthalic anhydride. |
| Polyol type | Pentaerythritol-glycerol | Glycerol | Pentaerythritol-glycerol. |
| Polyol ratio (pentaerythritol/glycerol moles) | 0.4/1.0 | | 2.6/1.0. |
| Phthalic contnet, wt. percent | 9 min | 22 | 25 min. |
| Oil length, weight percent | 85 | 70 | 61. |
| Acid Number | 10 max | 10 max | 4 max. |

Gloss enamels were prepared employing the resin vehicles of Table I. These resin combinations were blended together before addition of pigment and other additives. The compositions of the paints are listed in Table II.

TABLE II.—PAINT FORMULAS 100-GALLON BATCHES

|  | Paint A, pounds | Paint B, pounds |
|---|---|---|
| Resin 1 (85% oil length) | 262 | 189 |
| Resin 2 (61% oil length) | | 70 |
| Resin 3 (70% oil length) | 44 | 32 |
| TiO$_2$, rutile pigment | 357 | 340 |
| CaCO$_3$ pigment | 112 | 108 |
| Zinc oxide | 12½ | 12½ |
| Aluminum stearate | 4 | 4 |
| Lecithin | 2½ | 2½ |
| Drier | 6½ | 6½ |
| Anti-skinning agent | 2½ | 2½ |
| Odorless thinner | 207 | 243 |
| Total | 1,010 | 1,010 |
| Vehicle solids | 59.6% | 54.6% |

PVC = (TiO$_2$ = 20, CaCO$_3$ = 10).
Vehicle viscosity = 100 centistokes.

The properties of the three-component paint of this invention (Paint B) were compared with those of paints obtained by adding conventional thixotropic additives to the conventional Paint A. The low-shear viscosity, Brushometer viscosity, sag rating and leveling rating of the paints were obtained.

Paint B was found to be more thixotropic than any of the paints obtained with the additives. Thus the paint is easy to brush and, at the same time, has an excellent sag resistance rating of 18+. In addition, the leveling rating of 6 is extremely good, while the additives destroyed the leveling rating of Paint A, yielding a material which would leave brush marks, etc.

The paints of this invention were compared with a number of representative commercially available gloss enamels and were found to be equal or superior to them in sag rating, leveling and brushability.

Figure 2:
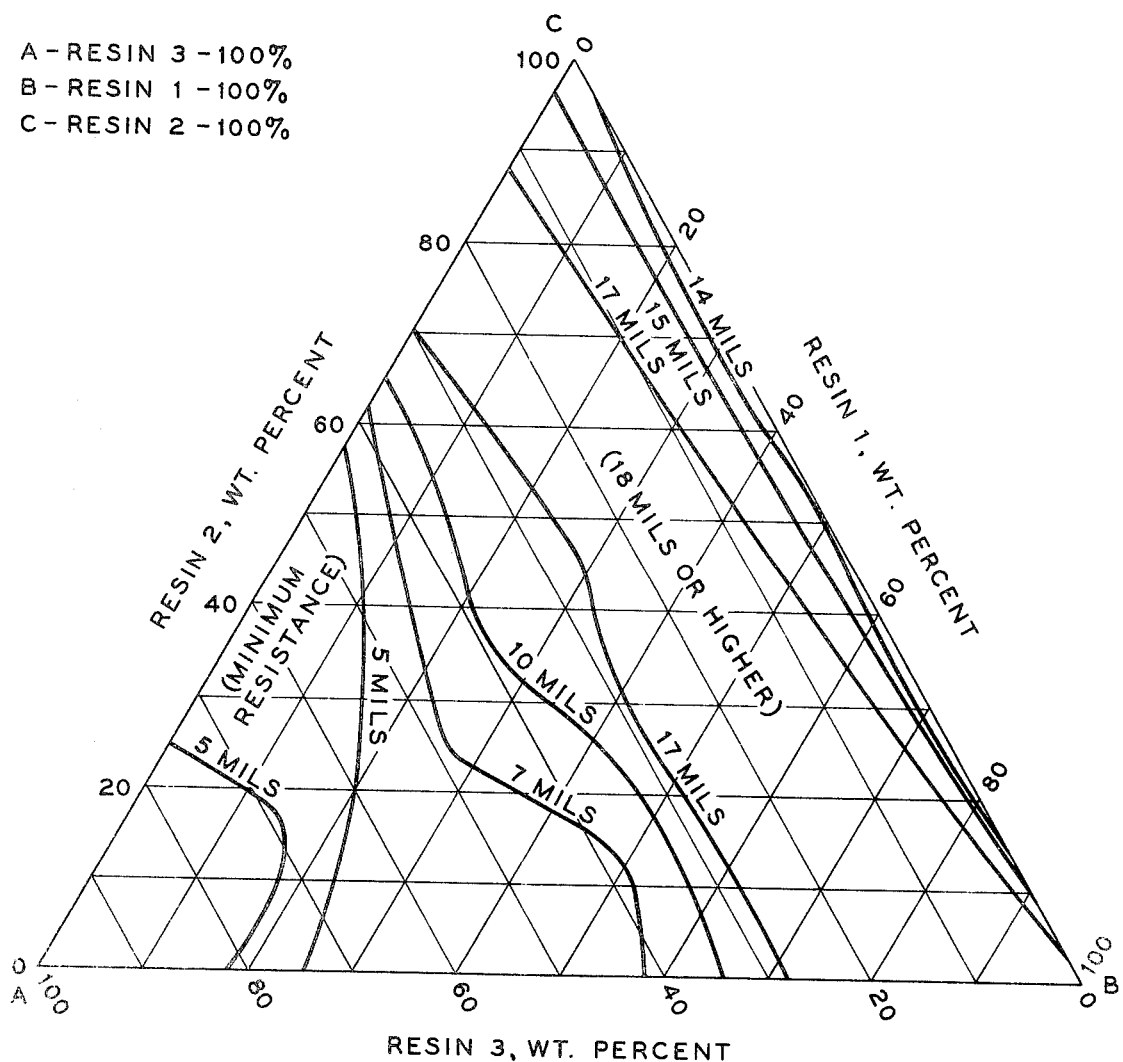
Figure 3:
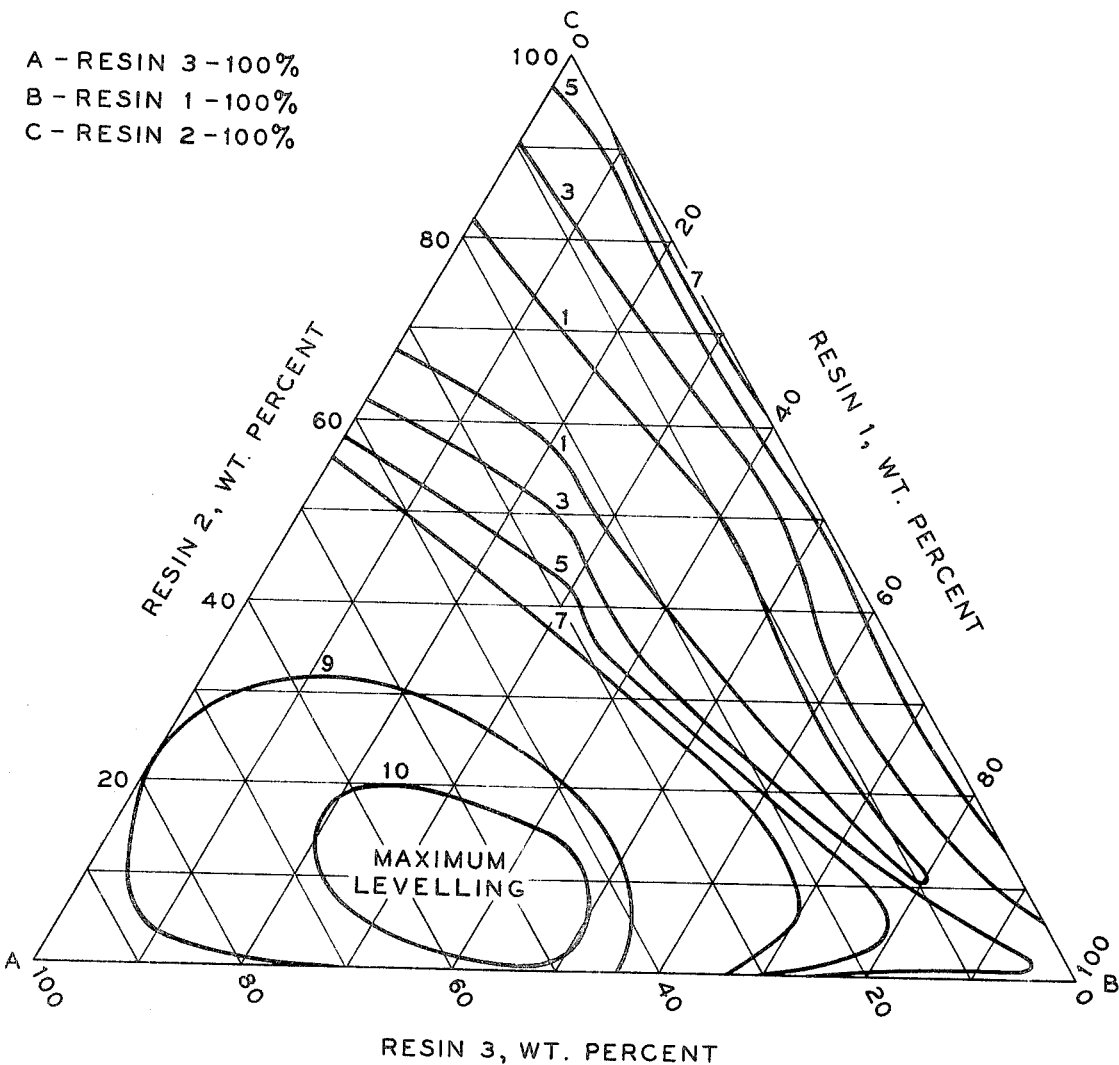
Figure 4:
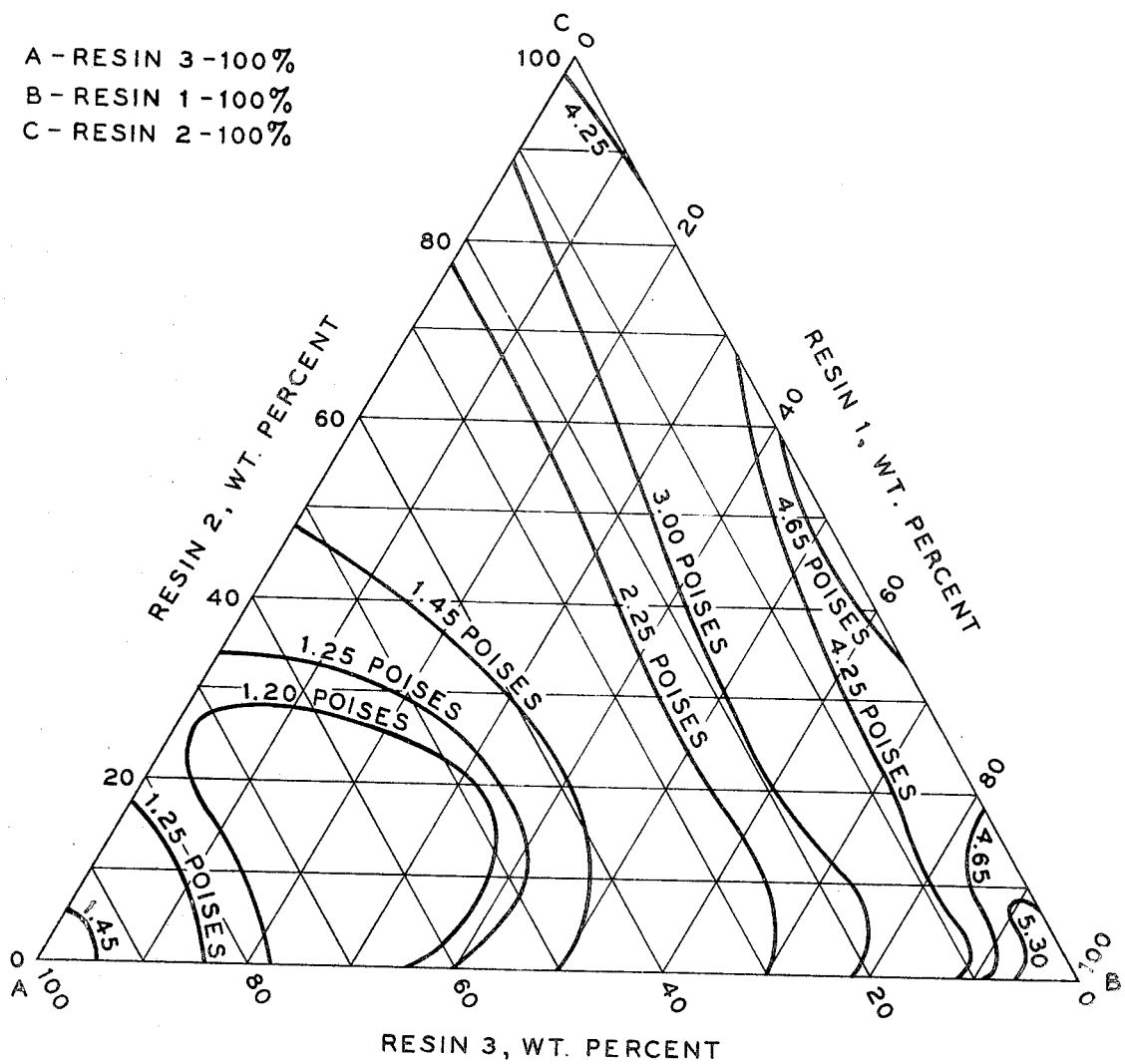

Appended FIGS. 2 through 4 show by way of triangular coordinate graphs the effect of varying concentrations of the three-resin components upon the most important characteristics of one-coat paint. The resins employed were Resins 1, 2 and 3, previously employed. FIG. 2 shows the effect of the resin proportions on sag resistance, FIG. 3, on leveling, and FIG. 4, on brushability. From a coordination of these factors with the greater emphasis being placed on sag resistance, which is most important to one-coat paints, the resin proportions outlined in FIG. 1 are derived.

While the preferred paints of this invention are gloss enamels, since the non-sag characteristics and gloss retention imparted by the vehicles are most important for these paints, the need for one-coat materials makes these vehicle combinations suitable for many other types of paint, such as flat enamels, etc.

In addition to the pigment, other normally used paint additives are employed in the paints of this invention, such as drying agents, extenders, corrosion inhibitors, etc.

What is claimed is:

1. A thixotropic paint having as a non-volatile vehicle a mixture of A, B, and C, the relative proportions of which are defined within the triangular area X, Y, Z of appended FIG. 1, wherein A and B are polyhydric alcohol phthalate resins modified by fatty acids from drying or semi-drying oils, A and B having, respectively, oil contents of from 55 to 69 and from 70 to 79 weight percent, wherein C is a drying oil or a polyhydric alcohol phthalate resin modified by fatty acids from natural drying or natural semi-drying oils, having an oil content greater than 79 weight percent, and wherein the difference in oil content between A and B and between B and C is at least 6 weight percent.

2. The paint of claim 1 wherein the relative proportions of A, B and C are defined with the area X', Y' and Z of appended FIG. 1.

3. The paint of claim 2 wherein the difference in oil content between A and B and between B and C is at least 9 weight percent.

4. The paint of claim 1 wherein A is a resin having an oil content of from about 57 to 66 weight percent, and C is a resin with an oil content of about 85 weight percent.

5. The paint of claim 1 in which A, B and C are phthalic acid-based alkyd resins.

6. A thixotropic, non-volatile paint vehicle comprising a mixture as defined in claim 1.

7. A paint vehicle comprising a mixture as defined in claim 2.

References Cited

UNITED STATES PATENTS

| 2,232,426 | 2/1941 | Barrett | 260—22 |
| 2,279,496 | 4/1942 | Sackett | 260—22 |
| 2,287,986 | 6/1942 | Gowing et al. | 260—22 |
| 2,889,293 | 6/1959 | Hershey et al. | 260—22 |
| 3,077,459 | 2/1963 | Hershey et al. | 260—22 |

OTHER REFERENCES

Rinse, Paint Technology, November 1946, vol. XI, No. 131, pp. 429 and 430.

Trimellitic Anhydride published 1958 by Amoco Chemicals Corp., pp. 10–23.

DONALD E. CZAJA, Primary Examiner

R. W. GRIFFIN, Assistant Examiner

U.S. Cl. X.R.

117—124, 161, 167; 260—40